Feb. 5, 1946.　　　W. P. NORTON, JR　　　2,394,469
MACHINE FOR CUTTING VARIABLE-WIDTH GROOVES IN CUTTER TEETH
Filed June 19, 1942　　　4 Sheets-Sheet 1

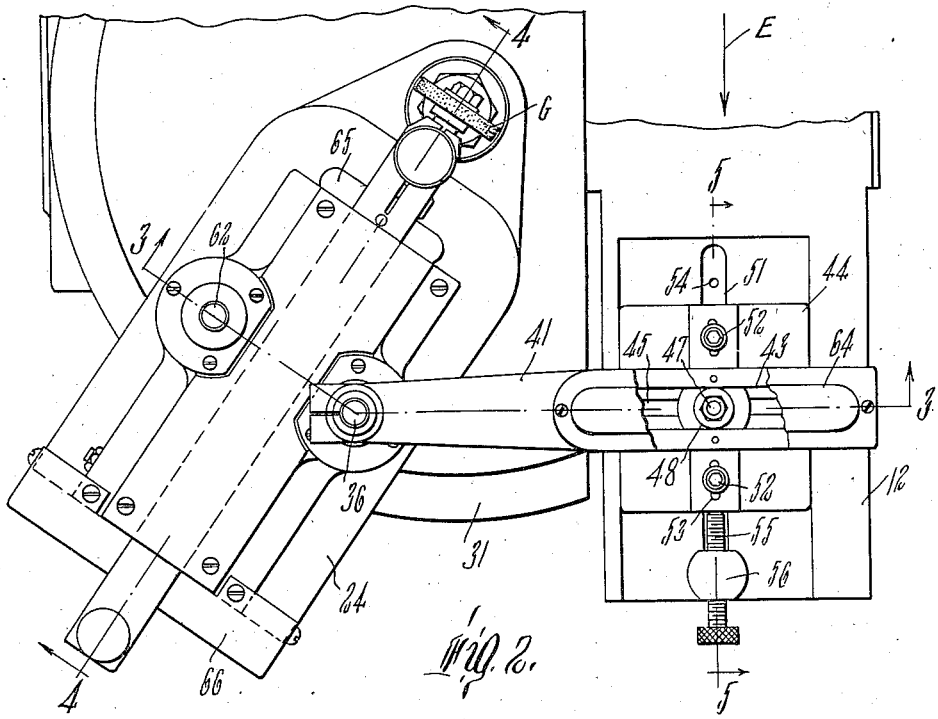
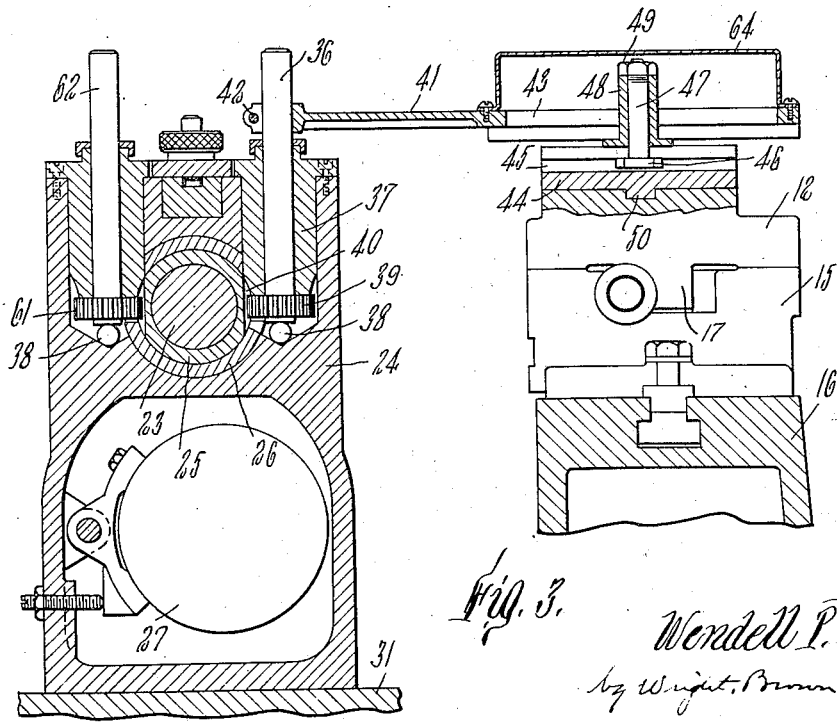

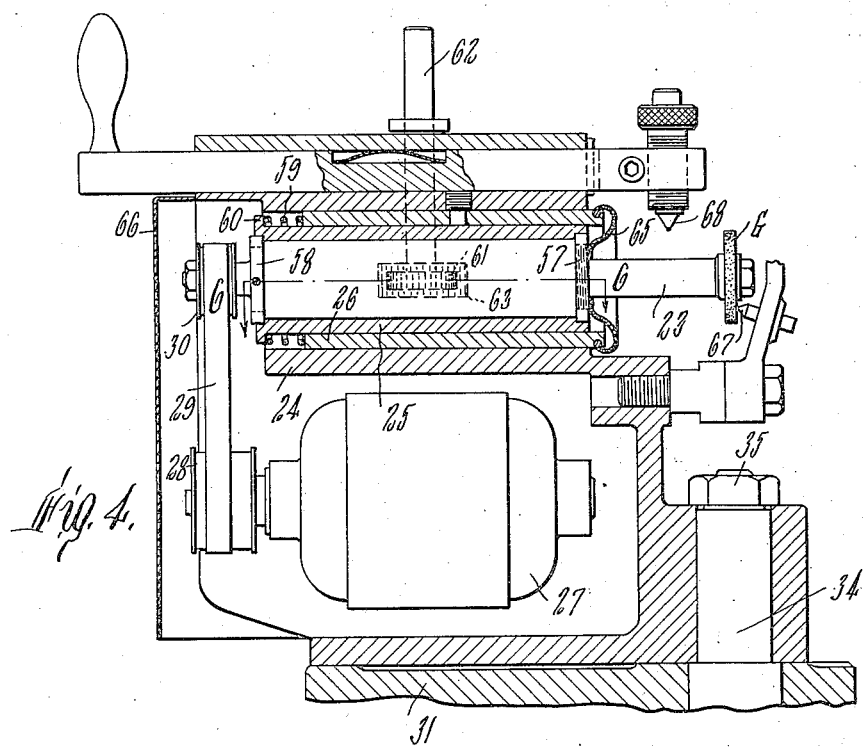
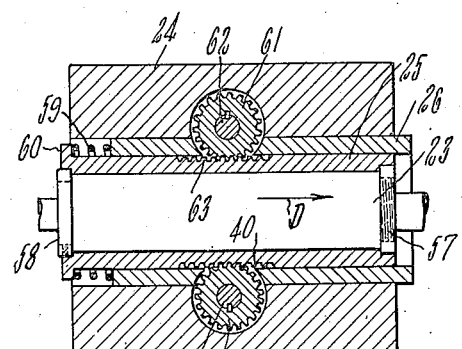
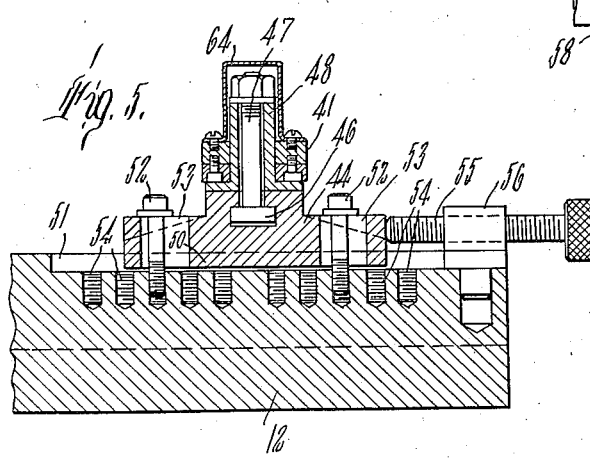

Feb. 5, 1946.  W. P. NORTON, JR  2,394,469
MACHINE FOR CUTTING VARIABLE-WIDTH GROOVES IN CUTTER TEETH
Filed June 19, 1942  4 Sheets-Sheet 4
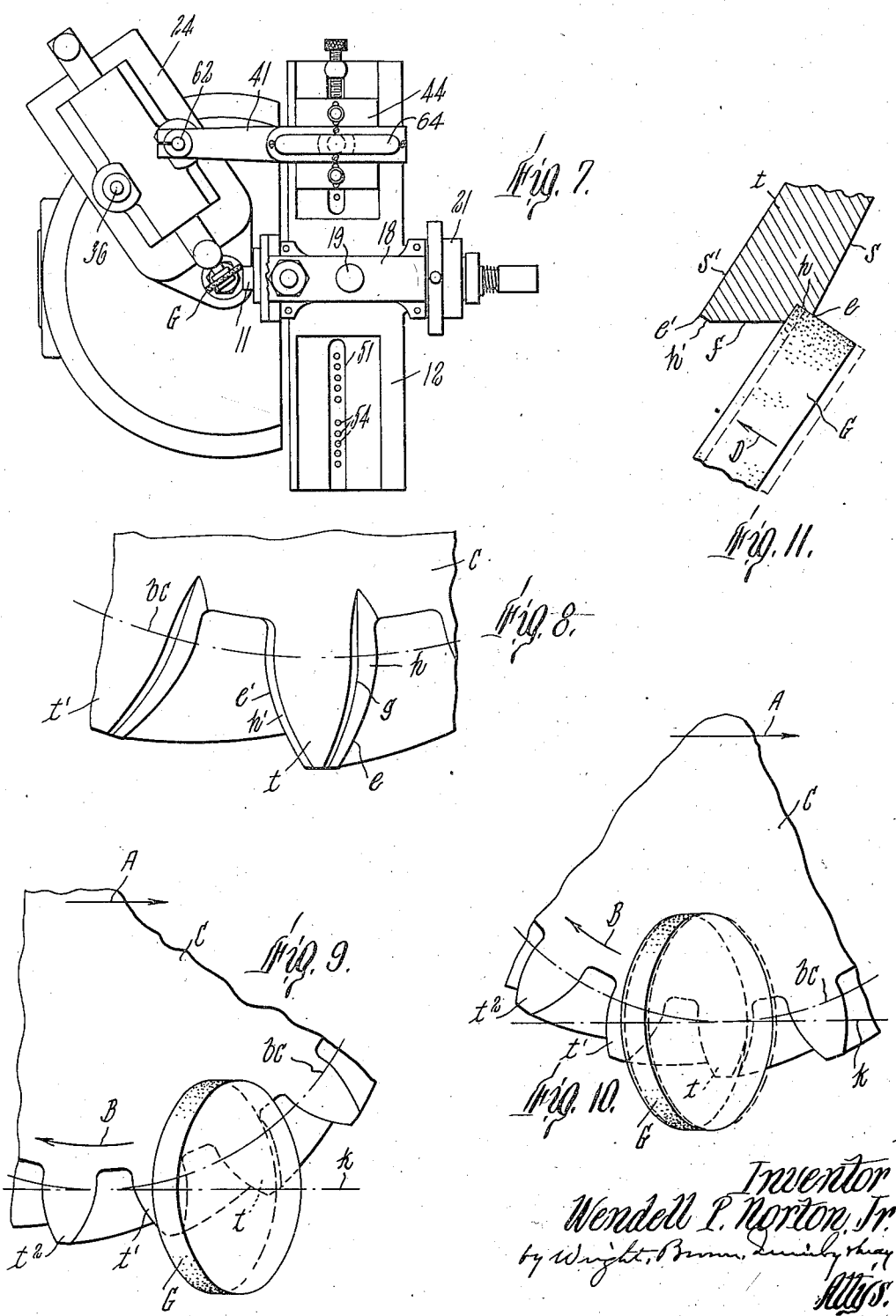
Inventor
Wendell P. Norton, Jr.
by Wright, Brown, Quinby & May
Attys.

Patented Feb. 5, 1946

2,394,469

UNITED STATES PATENT OFFICE 2,394,469

MACHINE FOR CUTTING VARIABLE-WIDTH GROOVES IN CUTTER TEETH

Wendell P. Norton, Jr., Springfield, Vt., assignor to The Fellows Gear Shaper Company, Springfield, Vt., a corporation of Vermont Application June 19, 1942, Serial No. 447,622

15 Claims. (Cl. 51—45)

The invention involved herein relates to planing cutters such as are used for cutting gears in the molding generating process, and is more particularly concerned with those cutters in which grooves are made in one end of the teeth contiguous to cutting edges for the purpose of providing a desired top rake throughout the extent of such edges. They are called flat top cutters because the end faces of their teeth, and their cutting edges, are located in a plane or planes perpendicular to the axis of the cutter. In that respect they differ from helical cutters of which the cutting edges lie substantially in planes normal to the tooth helices, and from spur-gear-type cutters of concave conical, or dished, formation at the cutting end. The grooves in the ends of such flat top cutter teeth are disposed to produce surfaces intersecting one or both side faces of the several teeth at an angle suitable to give the desired top rake. In the case of helical cutters of this character, such grooves are provided only in connection with the tooth faces which make an obtuse angle with planes perpendicular to the axis; and with some cutters of spur type grooves are provided contiguous to both opposite side faces of the teeth.

With many cutters, and this is particularly true with cutters having narrow teeth, or teeth especially narrow at the tip, grooves as wide as can be accommodated within the boundaries of the tip are not wide enough at the root or base, and adjacent regions of the tooth, to give sufficient clearance for free escape of chips. In such cases it is necessary to widen the groove at and adjacent to the root. Preferably variations between narrowest and widest portions of the groove should be gradual, so that the inner bounding wall of the groove may be a continuous smooth curve. This object has previously been stated, and the method of achieving it described, in the pending application of James L. Williamson, Serial No. 434,055, filed March 10, 1942, which matured as Patent 2,354,165, on July 18, 1944. My object is to achieve the same result as described in said application, and to accomplish it automatically by means of mechanism associated with a cutter grooving or sharpening machine and organized to displace the groove forming tool in a manner to alter the width of the groove in the course of the groove cutting action.

The invention consists in combined means organized to effect relative movement between a gear shaper cutter and a groove forming tool in such manner as to generate the surface of the groove which provides the top rake, in proper relation to the side face of the tooth and, in addition, to cause automatically a progressive widening and deepening of the groove in the direction from the tip to the root of the tooth. More specifically, and in the embodiment hereinafter described, it consists in the combination of means for effecting a relative rolling movement between the cutter and groove forming tool, and means for simultaneously effecting a displacement of such tool in a path substantially normal to the adjacent side face of the tooth, toward the median line of the tooth in the course of such rolling movement in one direction, and away from that median line during the relative rolling movement in the opposite direction. The said embodiment of the invention has been designed as an attachment or adjunct to a cutter grooving and sharpening machine of the character shown in the patent to Edward W. Miller No. 1,991,406, granted February 19, 1935, but without intent to limit it to that specific combination and environment.

In the drawings:

Fig. 2 is a plan view of so much of the machine shown in Fig. 1 as contains the connections and means for varying the width of the groove;

Fig. 3 is a vertical section on line 3—3 of Fig. 2;

Figure 1:
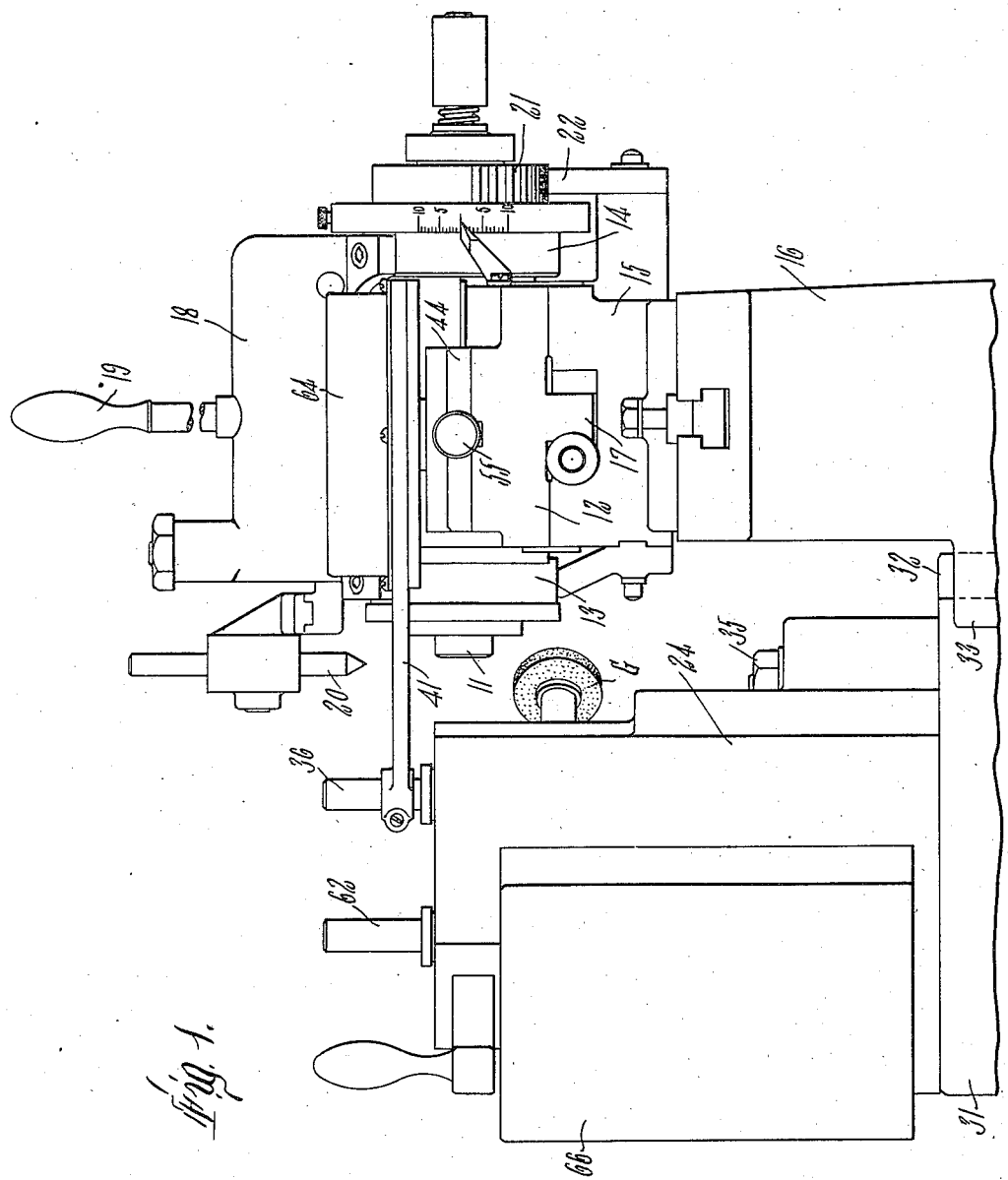
Fig. 1 is a side elevation of a cutter grooving and sharpening machine containing the last mentioned embodiment of the invention.

Figs. 4 and 5 are vertical sections taken on lines 4—4 and 5—5, respectively, of Fig. 2;

Fig. 6 is a partial section taken on line 6—6 of Fig. 4;

Fig. 7 is a plan view of the complete machine, on a smaller scale than the preceding figures, showing a different adjustment of the groove generating tool;

Fig. 8 is an end view on an enlarged scale of a helical gear shaper cutter showing parts of two teeth after having been operated on by the machine;

Figs. 9 and 10 are diagrams illustrating two of the positions occupied, respectively, by the grooving tool and cutter in the course of grooving or sharpening one tooth;

Fig. 11 is a sectional view of one of the cutter teeth shown in Fig. 8 taken on the base cylinder of the cutter, with the grooving tool in action thereon at the widest part of the groove.

Like reference characters designate the same parts wherever they occur in all the figures.

In explanation of the object sought and the procedure carried out by means of the mechanism which constitutes this invention, attention is directed first to Figs. 8–11 inclusive. Here C represents a gear shaper cutter of the flat top variety having helical teeth $t$, $t'$, $t^2$, etc. The end face of this cutter and of the cutting ends of its teeth lie in a plane, or closely adjacent planes, perpendicular to the axis of the cutter. The plane of the end face is indicated at $f$ in Fig. 11. As is shown by Fig. 11, the side face $s$ of the cutter tooth $t$ (and the corresponding face of every other tooth) makes an obtuse angle, and the opposite side face $s'$ makes an acute angle, with the end face $f$. The obtuse angle is too large to make a good cutting edge at the intersection of the faces $f$ and $s$, while the acute angle, at least with cutters of relatively large helix angle, is usually too small to provide adequate strength in an edge formed by the intersection of the faces $f$ and $s'$. Therefore a groove $g$ is cut in the face $f$ contiguous to the side face $s$ with a bounding surface $h$ of the groove intersecting the side face $s$ and extending thence toward the median line of the tooth at a suitable angle to provide desired top rake at the cutting edge $e$. The opposite boundary of the face $f$ is beveled in intersection with the side face $s'$ to form a cutting edge $e'$ and a contiguous top rake surface $h'$ making a less acute angle with the face $s'$ than does the end face $f$. However, this invention is not concerned with such beveling, but with only the top rake grooving.

Flat top cutters of spur gear character are grooved contiguous to both side edges. In all cutters the side faces are generated with a converging taper away from the cutting end to provide a clearance back from the cutting edges.

In forming such grooves initially, and deepening them subsequently to sharpen the cutting edges after wear, a relative rolling motion is produced between the cutter and a grooving tool compounded of rotation around the axis of the cutter and linear translation of either the cutter or the grooving tool. Generally the grooving tool is a rotatable grinding wheel; and such a wheel is shown in these drawings and is designated G. When the grooving is done by machines of the before named Miller patent, both components of rolling motion are given to the cutter while the grinding wheel remains in the same location. When grooving from tip to root of a left hand helical tooth, which is the situation illustrated in Figs. 9 and 10, the center of the cutter is moved in a straight line in the direction of the arrow A and the cutter is rotated about its axis in the direction of the arrow B, at speeds correlated to produce the same displacement effects as though the base circle $bc$ were rolled on a straight line $k$. The grinding wheel, being then located so that the corner between one end face and the peripheral face enters the end face of the cutter tooth adjacent to the tip, while the peripheral face extends across the side face $s$ of the tooth at the prescribed angle of top rake, then cuts the groove $g$ and generates the bounding surfaces of the groove as involute helicoids of the base circle $bc$. For widening the groove in the wider parts of the tooth, the grinding wheel is shifted in the direction of the arrow D (Fig. 11), while the cutter rolls from the position in Fig. 9 to that of Fig. 10, and is shifted in the opposite direction when the rolling movement of the cutter is reversed. Those directions are parallel to the middle peripheral element of the grinding wheel in contact with the cutter tooth and are substantially normal to the curvature of the groove and to the tooth face $s$, but inclined from the exactly normal relation to such face by the angle of top rake. The extent of shift, when cutting a groove of the dimensions shown in Fig. 8, is indicated by the full and broken line positions of the grinding wheel in Fig. 11.

In the embodiment of means herein illustrated for accomplishing the result described, the cutter to be sharpened is clamped on the end of a spindle 11 (Fig. 1), contained rotatably in a rocking holder, which in turn is mounted rotatably in a carriage 12. Said holder is provided on opposite ends with a flange or head 13 and a collar 14 overlapping the ends of its bearing in the carriage. The carriage in turn slides on a stationary base 15, bolted adjustably on a pedestal 16, and is constrained to move in a straight path at right angles to the axis of the rocking holder and spindle by a guide 17 fitted to a guideway in the base. A bridge or yoke 18 is made fast to the parts 13 and 14 of the spindle holder and is provided with a handle 19 whereby the spindle may be rocked or oscillated. A rod 20, carried by the yoke 18 is arranged to enter between any two contiguous teeth of the cutter and rotates the latter along with the spindle holder. A gear segment 21 secured to the spindle holder meshes with a rack 22 secured to the base 15 whereby angular movement of the yoke and spindle holder causes the carriage to be displaced bodily in its prescribed path. This gear segment is interchangeable with others of different operating pitch radii and the rack is adjustable to mesh with all such interchangeable segments, within limits. Preparatory to the grooving or sharpening of any specific cutter, a segment appropriate for that cutter is selected. Usually one of which the pitch circle radius with respect to the rack is the same as the base circle radius of the cutter is employed.

The grinding wheel G is carried by the protruding end of a spindle or shaft 23 mounted rotatably in a housing or guide structure 24 and has a cylindrical peripheral face coaxial with the spindle. To distinguish one spindle from the other, the one which carries the grinding wheel may be called the tool spindle and the one on which the cutter is mounted may be called the work spindle. The bearing for the grinding wheel spindle 23 is a slide, preferably made as sleeve 25 fitted to slide endwise in a bushing 26 secured immovably in the housing 24. A motor 27 mounted in the housing adjacent to the tool spindle transmits rotation to the latter by a pulley and belt drive 28, 29 and 30, of which one of the pulleys (in this instance the pulley 28) has a face wider than the belt to permit endwise movement of the spindle and grinding wheel through a sufficient range for the purpose. A convenient mode of mounting the motor, whereby its weight may be utilized to apply a regulated tension to the belt, is shown in Fig. 3.

The tool spindle housing or guide structure 24 rests on a bracket 31, which is secured by complemental guide members 32 and 33 to the pedestal 16, in a manner to permit vertical adjustment of the bracket to accommodate the grinding wheel to cutters of different diameters. Preferably the grinding wheel is arranged and adjusted to place its axis in the imaginary plane in space, corresponding to the line $k$ of Figs. 9 and 10, on which the base circle of the cutter rolls during the grooving action.

The grinding wheel may also be adjusted angularly to generate a top rake surface (represented by the surface $h$ in Figs. 8 and 11), at any desired degree in cutters of any helix angle and of right hand or left hand inclination. For this purpose the housing 24 is coupled to the bracket 31 by a pivot 34, the axis of which preferably intersects the axis of the tool spindle 23 at a point near the grinding wheel. The position of these parts for acting on the left hand helical cutter illustrated in Figs. 8–11 is shown in Fig. 2, and that for similarly acting on a right hand cutter is shown in Fig. 7. Clamping means of any known, or other, suitable character, not shown here, may be provided for securing the housing in its various positions. But generally friction between the heavy housing and the supporting bracket, supplemented by the clamping effect due to setting up a nut 35 on the pivot 34 is sufficient to prevent accidental displacement of the housing.

Endwise movement is imparted to the bearing sleeve 25, and thereby to the tool spindle and grinding wheel, from the work carriage 12 by the following connections. A shaft 36 is mounted rotatably in a bearing 37 in the housing 24. Its inner end is supported by a ball 38 beside the sleeve 25 and carries a gear 39 in mesh with rack teeth 40 cut in the side of sleeve 25. The outer end of shaft 36 protrudes from the housing and to it is secured an arm 41.

Arm 41 has a split hub portion at one end which surrounds the shaft 36 and is caused to grip the shaft by a clamp screw 42. It extends from the shaft across the carriage 12, having an elongated slot 43 in the part which overlies the carriage. A block 44 is secured to the carriage beneath arm 41 and is formed with a transverse undercut slot 45, in the undercut part of which is confined the head 46 of a bolt 47 which rises from the block through the slotted arm and carries a sleeve or bushing 48 and a nut 49. The nut, reacting on the upper end of the bushing, serves to secure the bolt in any adjusted position by clamping the flanges of the undercut slot between the bolt head and the adjacent flanged end of the bushing. The external diameter or width of the bushing is equal to the width of slot 43.

Block 44 is adjustable on the carriage, having a guide rib 50 on its under side contained in a groove 51 which extends lengthwise of the carriage. Bolts 52 extend through slots 53 in the block into tapped holes 54 in the carriage. A number of such holes are provided, spaced apart along the groove 51, into different ones of which the bolts may be entered. Slots 53 are enough longer than the spacing between such holes to permit settings of the block at all intermediate points between those established by location of the bolts in different holes. An adjusting screw 55 is threaded through an abutment nut 56 mounted in the carriage and is arranged to bear and apply pressure to the nearer end of the block. These adjustments permit the block to be located anywhere in the space between the abutment 56 and the farther end of groove 51.

Thus the carriage, when moved in the direction indicated by the arrow E in Figs. 2, 9 and 10, turns the arm 41 and pinion 39 clockwise, moving the sleeve 25 in the direction of the arrow D in Figs. 6 and 11. Suitable thrust means, such as collars 57 and 58 on the tool spindle, overlapping internal shoulders in sleeve 25, transmit endwise movements of the sleeve in either direction to the spindle, and thereby to the grinding wheel. Reverse movement of the carriage causes withdrawal of the grinding wheel. A spring 59 confined between a flange 60 on sleeve 25 and the adjacent end of the fixed bushing 26, takes up backlash between the pinion 39 and teeth 40.

Moments proportional to the travel of the carriage are thus imparted to the grinding wheel in the direction to widen the groove g when the cutter rolls from the position of Fig. 9 to that of Fig. 10, and to narrow the groove when the cutter rolls in the opposite direction. The ratio of grinding wheel movement to carriage travel may be varied by shifting the pivot bolt 47 along the slots 45 and 43, thereby changing the effective length of the arm 41. The slotted portion of the arm is long enough, not only to permit such adjustment, but also to permit angular adjustment of the grinding wheel according to the helix angle of the cutter being grooved and the degree of top rake required. Adjustments of the block 44 lengthwise of the carriage determine the locations of the points at which the endwise shifting of the grinding wheel begins and ends.

A duplicate pinion 61, shaft 62 and rack teeth 63 are provided at the opposite side of the sleeve 25 for controlling the shifting of the grinding wheel when grooving cutters of opposite hand to that here shown. The housing 24 is then placed at the opposite inclination, substantially as shown by Fig. 7, the block 44, or a duplicate thereof, is mounted on the opposite end portion of the carriage in like manner to that above described, and the arm 41 is secured to the shaft 62 and engaged with the block 44 in like manner. Reciprocations of the carriage then produce similar but relatively opposite axial movements of the grinding wheel.

It is to be understood of course that movements of the carriage which serve to roll the cutter away from the grinding wheel are continued far enough to bring the cutter entirely clear of the grinder so that it may be indexed.

A removable dust guard 64 is mounted on the arm 41 to cover the pin and slot connection thereof with the block 44; another dust guard 65 is secured to the bushing 26 and bears with spring pressure on an external shoulder of the tool spindle overlapping the adjacent end of the spindle bearing; and a dust cover 66 is secured detachably to the outer end of housing 24, covering the outer end of the spindle bearing and the drive between the motor and tool spindle. Truing tools 67 and 68, of conventional character, are provided to dress the end face and peripheral face, respectively, of the grinding wheel.

While I have herein described an embodiment of the invention particularly designed for cooperation with cutter sharpening machines such as are illustrated in the before named Miller patent, I wish to make clear that I am not limited to the details of such embodiment or design, but that the invention includes other embodiments and combinations containing the same general principles as hereinbefore described. For instance, the invention includes organizations wherein the translative component of relative rolling movement is imparted to the grooving tool, or both components to the tool, instead of both to the cutter being grooved.

In further definition of the term "grooving" used in the foregoing specification, I would say that this term includes both the initial grooving of new cutters and the sharpening of cutters which have become dull in use. Even though sharpening may involve no more than deepening of the previously formed groove by a minute distance, yet the operation is the same in that case and is considered to be aptly designated by the term here defined.

What I claim and desire to secure by Letters Patent is:

1. Apparatus for grooving the end face of a gear shaper cutter tooth to produce a top rake surface of varying width intersecting a side face of the tooth, comprising means for effecting relative rolling movement between such a cutter and a grooving tool, means for supporting such tool with its cutting portion extending across a side face of such cutter tooth in position at a suitable angle to the plane of such rolling movement to generate a top rake surface meeting such side face in a cutting edge in consequence of such relative rolling movement, said grooving tool being movable along the line of the engagement with the cutter tooth, and automatic means associated with the before named means and organized to effect shifting of the grooving tool across said side face simultaneously with the progress of relative rolling movement.

2. A cutter grooving machine comprising the combination of a grinding wheel and means for effecting relative rolling motion between the tooth of a gear shaper cutter and such grinding wheel such that a top rake surface is generated in the tooth intersecting one side face of the tooth in a cutting edge, and motion transmitting connections between the means for effecting such rolling movement and the grinding wheel organized to effect a progressive displacement between the grinding wheel and cutter in the general direction of the axis of the grinding wheel.

3. The combination of a work holder adapted to support a gear shaper cutter, a grooving tool, a tool holder supporting said grooving tool with its cutting portion intersecting one side and one end face of a tooth of such gear shaper cutter and extending a limited distance from said side face toward the median radial line of the tooth, means for producing relative movement between the cutter holder and grooving tool holder compounded of rotation around the axis of the cutter and translation in a straight line, with effect equivalent to that of rolling the base circle of the cutter tooth curve on a plane in which the cutting element of the grooving tool is located, and motion transmitting connections between said holders organized to effect shifting of the grooving tool so as to cause the groove cut thereby to be wider at the root and contiguous parts of the cutter tooth than at the tip thereof.

4. A machine for cutting grooves in the end faces of the teeth of gear shaper cutters comprising a grooving tool, means for effecting relative rolling movement between a gear shaper cutter and such tool, means for holding the tool with its cutting portion extending across a side face of a tooth of such cutter and within the plane of one end face therof partially across the width of the tooth from such side face, such rolling movement being arranged to cause traverse of the tool from the tip toward the root of the tooth and vice versa, and means connected between said tool holding means and the means for effecting said rolling movement constructed and arranged to advance the tool further inward from the side face during the relative traverse from the tooth tip toward the tooth root.

5. A machine for generating top rake grooves in the end faces of gear shaper cutter teeth comprising a grinding wheel mounted rotatably and with provision for displacement transversely to its plane of rotation, said grinding wheel having peripheral and end cutting faces, means for supporting and rolling a gear shaper cutter past such grinding wheel in a path such as to cause the grinding wheel to cut a groove in the end face of one of the cutter teeth contiguous to a side face of that tooth, and motion transmitting connections between the last named means and the grinding wheel organized to shift the grinding wheel progressively in one direction in the course of such rolling movement.

6. A machine for grooving the teeth of gear shaper cutters comprising an endwise movable carriage, a rocking holder mounted on said carriage to turn about an axis transverse to the path of the carriage having means for supporting a cutter for grooving action, a grooving tool holder, a grooving tool carried by said holder and located in position to cut a groove in the end face of a tooth, adjacent to a side face thereof, of a cutter supported by said rocking holder, in consequence of correlated angular movement of the rocking holder and endwise movement of the carriage, said grooving tool holder being displaceable in a path transverse to the axis of the rocking holder, and connections between the carriage and grooving tool holder organized to impart movement to the latter in consequence of endwise movement of the carriage.

7. The combination of a carriage mounted with provision for movement in a prescribed path, a tool spindle holder mounted adjacent to the carriage with provision for movement translatively in a different path, a tool spindle rotatably mounted in said holder, a lever pivoted adjacent to the tool spindle holder extending thence to the carriage and engaged therewith to be rocked when the carriage travels, and motion transmitting means between the lever and spindle holder constructed to shift the spindle holder when the lever is rocked.

8. The combination of a carriage mounted for translative movement in a given path, a housing structure adjacent to the carriage, a spindle holder mounted for endwise movement in the housing structure provided with a series of teeth, a tool spindle mounted rotatably in said spindle holder and being movable endwise therewith, a gear element mounted rotatably in the housing structure in mesh with the teeth of the spindle holder, an arm connected with the pinion to turn about the axis thereof and impart rotation thereto when so turned, and means on the carriage coupled with said arm for imparting angular movement thereto when the carriage is moved.

9. The combination of a carriage mounted for movement in a prescribed path, a tool holder supported adjacent to the carriage with provision for movement in a different path, a lever pivoted adjacent to said holder and connected therewith to transmit movement to the holder when turned about its pivot axis, said lever extending from its point of support toward the carriage in a direction transverse to the carriage path, and a pivot interconnected between said lever and carriage for imparting angular movement to the lever when the carriage travels.

10. The combination set forth in claim 9 and including provisions for adjusting said pivot connection so as to vary the extent of angular movement imparted to the lever by a given translative movement of the carriage.

11. The combination of a carriage mounted for movement translatively in a prescribed path, a support adjacent to the carriage, a tool holder located and movable on said support in a prescribed path, said support being angularly adjustable to place the tool holder path at various inclinations to the carriage path, a lever pivotally mounted on said support and coupled with the tool holder to impart movement to the latter when turned about its pivot axis, said lever extending from its point of support toward the carriage, and a pin and slot connection between the lever and carriage constructed to impart angular movement to the lever when the carriage is moved, and the slot element of said connection having an extent sufficient to permit the before mentioned angular adjustment of the tool holder support.

12. The combination of a carriage mounted with provision for translative movement in a given path, a tool holder support located adjacent to the carriage, a tool holder mounted on said support with provision for displacement, a lever pivoted to said support extending toward the carriage and having a slot of which the length dimension is generally transverse to the carriage path, a pivot located in said slot and engaged with the carriage for transmission of motion from the carriage to the lever, said pivot being adjustable lengthwise of the slot and crosswise of the carriage path for varying the angle through which the lever is turned in consequence of a given length of carriage travel, and transmission means between the lever and tool holder for moving the latter when the lever is turned about its pivot axis.

13. A machine of the character set forth comprising a carriage guided to move in a prescribed path, a pivot element mounted on said carriage, provisions whereby said pivot element may be located in different positions both lengthwise and crosswise of the carriage path, a tool holder support adjacent to the carriage, a lever pivotally mounted on said support extending toward the carriage and having a slot of which the length dimension is transverse to the carriage path and the sides embrace said pivot member, a tool holder mounted for displacement translatively on said support, and connections between said lever and tool holder for so displacing the tool holder when the lever is rocked about its axis.

14. A machine for forming a top rake surface in the end face, and intersecting the obtuse angle side face, of a tooth of a helical gear shaper cutter, comprising the combination of a groove cutting tool, means for effecting relative movement between said tool and cutter tooth such that the cutting effect of the tool is progressively applied at successive points between the tip and root of the tooth, and motion transmitting connections between said tool and the said movement-effecting means organized to cause relative displacement between the tool and the cutter tooth transversely of the side face of the tool in the course of progression of the groove cutting action.

15. In a machine of the character described, the combination of a supporting structure, a work carriage mounted movably on said supporting structure, a tool holder guide mounted on the supporting structure adjacent to the carriage, a tool holder supported by said guide with provision for movement thereon in a prescribed path, the guide being angularly adjustable to locate such path at various inclinations to the path in which the carriage moves, and transmission mechanism between the carriage and tool holder for imparting movement from the former to the latter comprising a part coupled with the carriage to be moved thereby when the carriage is moved and an associated part engaged with the tool holder for simultaneously moving the latter in its prescribed path.

WENDELL P. NORTON, JR.